US007660917B2

(12) United States Patent
Freking et al.

(10) Patent No.: US 7,660,917 B2
(45) Date of Patent: Feb. 9, 2010

(54) SYSTEM AND METHOD OF IMPLEMENTING MULTIPLE INTERNAL VIRTUAL CHANNELS BASED ON A SINGLE EXTERNAL VIRTUAL CHANNEL

(75) Inventors: Ronald E. Freking, Rochester, MN (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 11/366,883

(22) Filed: Mar. 2, 2006

(65) Prior Publication Data
US 2007/0208899 A1 Sep. 6, 2007

(51) Int. Cl.
*G06F 3/00* (2006.01)
(52) U.S. Cl. .............................. 710/36; 710/5; 710/29; 710/31; 710/39; 710/60
(58) Field of Classification Search ........................ None
See application file for complete search history.

(56) References Cited

U.S. PATENT DOCUMENTS

| 4,809,164 | A * | 2/1989 | Fuller ........................... 710/41 |
| 6,993,611 | B2 * | 1/2006 | Ajanovic et al. ............. 710/107 |
| 7,209,489 | B1 * | 4/2007 | Bailey et al. ................. 370/412 |
| 2003/0204653 | A1 * | 10/2003 | Katayama ..................... 710/52 |

* cited by examiner

*Primary Examiner*—Eron J Sorrell
(74) *Attorney, Agent, or Firm*—Dillon & Yudell LLP (57) ABSTRACT

A method, system, and computer-usable medium for coupling a collection of devices to a bridge, wherein the collection of devices includes high-performance devices and low-performance devices, coupling a data bus to the bridge, utilizing a collection of transfer credits to allow transfer of commands to the collection of devices, transferring commands to the collection of devices only when at least one transfer credit is available, and in response to determining a number of transfer credits falls below a predetermined threshold, utilizing a command arbitration scheme that gives priority to commands to the high-performance devices among the collection of devices.

14 Claims, 5 Drawing Sheets

SYSTEM AND METHOD OF IMPLEMENTING MULTIPLE INTERNAL VIRTUAL CHANNELS BASED ON A SINGLE EXTERNAL VIRTUAL CHANNEL

BACKGROUND OF THE INVENTION

1. Technical Field

The present invention relates in general to the field of data processing systems. More specifically, the present invention relates to managing bus transactions on data processing systems. Still more specifically, the present invention relates to a system and method of implementing multiple internal virtual channels based on a single external virtual channel in a data processing system.

2. Description of the Related Art

Introduced in the early 1990s, the Peripheral Component Interconnect (PCI) bus unified the diverse input/output (I/O) buses available on personal computers (PCs) at the time. Some of these I/O buses included the Video Electronics Standards Association (VESA) local bus, Extended Industry Standard Architecture (EISA), Industry Standard Architecture (ISA), and Micro Channel Architecture (MCA). Initially, the PCI bus was implemented as a chip-to-chip interconnect and a replacement for the fragmented ISA bus. During the first years of implementation, the 33 MHz PCI bus adequately served the I/O bandwidth requirements of mainstream peripherals. Today, however, processor and memory clock frequencies have increased dramatically, with processor clock speeds increasing at a more aggressive rate.

In the early 2000s, the PCI Express (PCIe) architecture was introduced. PCIe is an implementation of the PCI bus that utilizes existing PCI programming concepts, but utilizes a different and faster serial physical-layer communications protocol. However, when a PCIe bridge is coupled to a collection of devices, slower devices may prevent high-performance devices from obtaining the bandwidth that they require. Therefore, there is a need for a system and method of addressing the abovementioned limitations.

SUMMARY OF THE INVENTION

The present invention includes method, system, and computer-usable medium for coupling a collection of devices to a bridge, wherein the collection of devices includes high-performance devices and low-performance devices, coupling a data bus to the bridge, utilizing a collection of transfer credits to allow transfer of commands to the collection of devices, transferring commands to the collection of devices only when at least one transfer credit is available, and in response to determining a number of transfer credits falls below a predetermined threshold, utilizing a command arbitration scheme that gives priority to commands to the high-performance devices among the collection of devices.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1:
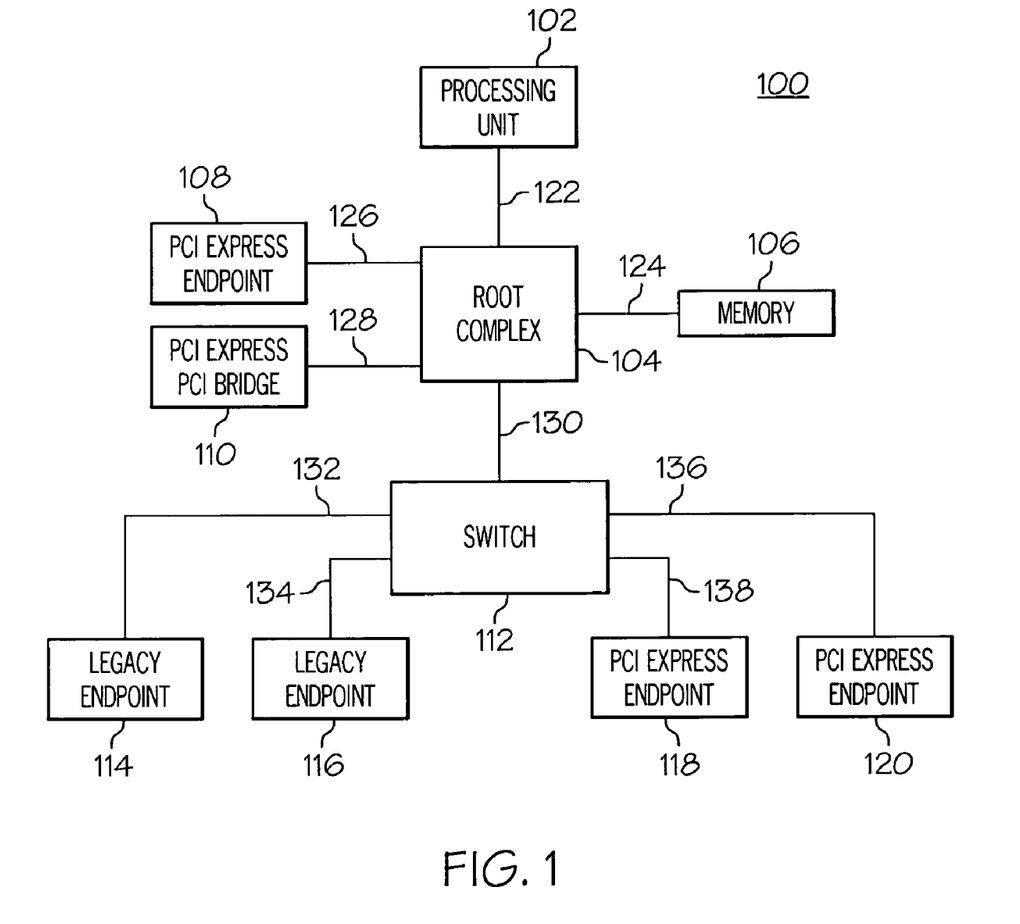
FIG. 1 is a block diagram illustrating an exemplary data processing system in which a preferred embodiment of the present invention may be implemented.

Referring now to the figures, and in particular, referring to FIG. 1, there is illustrated a block diagram depicting an exemplary data processing system 100 in which a preferred embodiment of the present invention may be implemented. As illustrated, data processing system 100 includes a processing unit 102, root complex 104, memory 106, PCI Express endpoints 108, 118, and 120, PCI Express-PCI Bridge 110, switch 112, and Legacy endpoints 114 and 116.

Processing unit 102 is preferably implemented as a central processing unit (CPU), but any processing unit may be utilized to implement processing unit 102. Root complex 104 is the root of an Input/Output (I/O) hierarchy and couples processing unit 102 (via interconnect 112) and memory 106 (via interconnect 124) to I/O systems such as switch 112, PCI Express endpoint 108, and PCI Express-PCI bridge 110.

PCI Express-PCI bridge 110 enables connection of PCI components to interface with data processing system 100 via PCI Express interconnect 128. PCI Express endpoint 108 represents a peripheral directly coupled to root complex 104 (i.e., without the means of a switch) via PCI Express interconnect 126.

Switch 112 couples legacy endpoints 114 and 116 (via PCI Express interconnect 132 and 134) and PCI Express endpoints 118 and 120 (via PCI Express interconnect 136 and 138). Those with skill in the art will appreciate that the PCI Express and Legacy endpoints may be implemented by any type of device that can be a requester or completer of a PCI Express transaction either on its own behalf or on behalf of a distinct non-PCI Express device.

Those skilled in the art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system 100 for implementing multiple internal virtual channels based on a single external virtual channel provided by the present invention are applicable to data processing systems of any system architecture and are in no way limited to the generalized architecture illustrated in FIG. 1.

Figure 2:
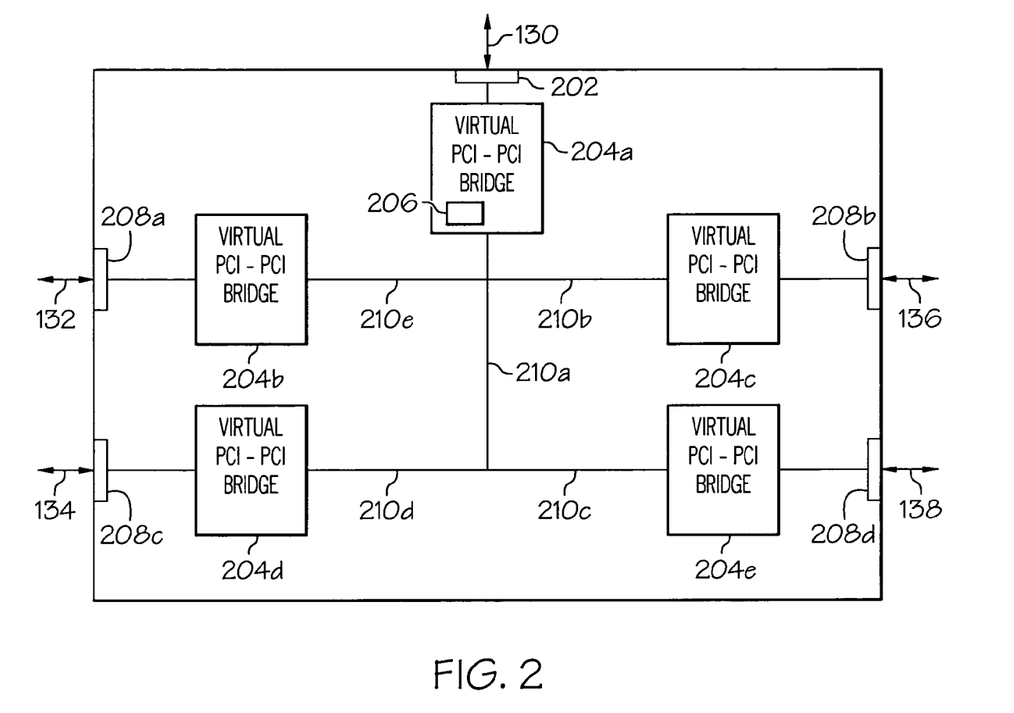
FIG. 2 is a block diagram depicting an exemplary switch in which a preferred embodiment of the present invention may be implemented.

FIG. 2 is a more detailed block diagram illustrating switch 112 of FIG. 1 according to a preferred embodiment of the present invention. As illustrated switch 112 includes a collection of Virtual PCI-PCI Bridges 204a-e, which forward traffic sent from the rest of data processing system 100 to Legacy endpoints 114-116 and PCI Express endpoints 118-120. Virtual PCI-PCI Bridges 204a-e are coupled within switch 112 by switch interconnect 210a-e. Virtual PCI-PCI Bridge 204a is coupled to upstream port 202, which is further coupled to PCI Express interconnect 130. Accordingly, Virtual PCI-PCI Bridges 204b-e are coupled to downstream ports 208a-e, which are further coupled to PCI Express interconnect 132-138. Virtual PCI-PCI Bridge 204a includes a virtual channel manager 206, discussed herein in more detail in conjunction with FIGS. 3 and 4, and utilized for controlling access to endpoints coupled to switch 112.

Figure 3:
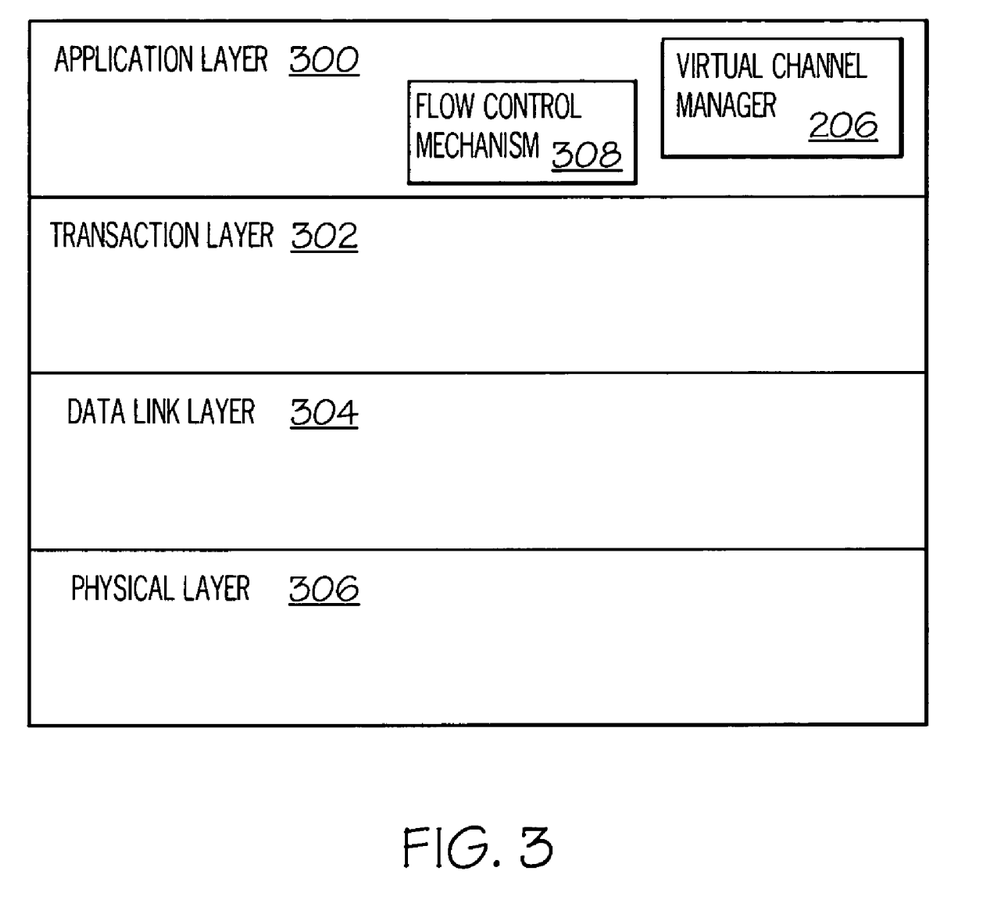
FIG. 3 is a block diagram illustrating an exemplary PCI Express fabric topology configuration according to a preferred embodiment of the present invention.

FIG. 3 is a block diagram depicting exemplary a PCI Express fabric topology configuration according to a preferred embodiment of the present invention. As depicted, the PCI Express fabric topology includes multiple logical layers: application layer 300 (including virtual channel manager 206 and flow control mechanism 308), transaction layer 302, data link layer 304, and physical layer 306.

The PCI Express architecture utilizes packets to communicate information between components with data processing system 100. Packets are created in transaction layer 302 and data link layer 304 to carry information from a transmitting component to a receiving component. As the transmitted packets flow through the other layers, they are extended with additional information that is required to handle packets at those other layers. At the receiving component side, the reverse process occurs and packets are transformed from their physical layer representation, to a data link representation, and finally, to a form that can be processed by transaction layer 302 of the receiving device. Application layer 300 interfaces with transaction layer 302 by providing additional instructions for packet processing. For example, in a preferred embodiment of the present invention, additional instructions are provided by virtual channel manager 206 and flow control mechanism 308. These additional instructions are discussed herein in more detail in conjunction with FIG. 4.

Transaction layer 302 coordinates the assembly and disassembly of Transaction Layer Packets (TLPs). TLPs are utilized to communicate transactions (e.g., read and write requests) between various data processing system 100 components. Also, transaction layer 302 is responsible for coordinating a credit-based flow control (discussed herein in more detail) for TLPs.

In a preferred embodiment of the present invention, each TLP includes a Traffic Class (TC) field, which enables differentiation of transactions into eight traffic classes. Together with the PCI Express virtual channel (VC) mechanism (discussed herein later in more detail), the TC field of each TLP enables differentiated traffic servicing. Each PCI Express TLP utilizes the TC field as an invariant label that is transmitted end-to-end within the PCI Express fabric. As the TLP is transmitted across the fabric, the TC field information is utilized at each link and each switch element (e.g., switch 112) to determine which virtual channel is utilized to route the particular TLP.

Transaction layer 302 utilizes a virtual channel (VC) mechanism to coordinate the transmission of packets, distinguished by information stored within each packet's traffic class (TC) field, between components of data processing system 100. A virtual channel (VC) is established when at least one traffic class is associated with a physical virtual channel resource that is identified with a VC ID. Utilizing PCI Express configuration software stored within system memory 106, a set of components may be designated as physical components that support a virtual channel or transmission path within data processing system 100. For example, a first virtual channel, designated by VC0, may be implemented between root complex 104 and switch 112. A traffic class (TC0) is assigned to VC0. Therefore, all packets of traffic class TC0 will be sent via VC0 or between root complex 104 and switch 112.

Transaction layer 302 and data link layer 304 implement a credit-based flow control mechanism 308 (described herein in more detail in conjunction with FIG. 5) to control transfer of commands to devices coupled to switch 112. In a preferred embodiment of the present invention, credit-based flow control mechanism 308 is utilized to prevent overflow of the receiving component's buffers. In order to prevent buffer overflow, credit-based flow control mechanism 308 maintains a credit pool of transfer credits. Each allocated transfer credit enables a transmitting component to send a TLP to a receiving component within data processing system 100. If there are no available transfer credits in the credit pool, no commands or requests may be sent to the receiving component (e.g., any devices coupled to switch 112). Also, as discussed in more detail in conjunction with FIG. 4, if the number of available transfer credits in the credit pool fall below a predetermined number, priority will be given to requests and command transfers targeted to high-performance devices.

Data link layer 304 acts as an intermediary between transaction layer 302 and physical layer 306. Data link layer 304 manages links between components within data processing system 100 and data integrity, including error detection and error correction. During packet transmission between a transmitting component and a receiving component, the data link layer of the transmitting component accepts TLPs assembled by transaction layer 302, applies a data protection code and TLP sequence number, and submits the packets to physical layer 306 for transmission across the link between the transmitting and receiving components. The receiving data link layer responsibilities includes checking the integrity of received TLPs and submitting the received TLPs to the receiving transaction layer for further processing. If a TLP error is detected, data link layer 304 requests re-transmission of TLPs until the requested information is correctly received by the receiving component, or the link between the components has been determined to have failed. Data link layer 304 also generates and analyzes packets that are utilized for data link management between the transmitting and receiving components.

Physical layer 306 includes all circuitry required for interface operation, including driver and input buffers, parallel-to-serial, and serial-to-parallel conversion, impedance matching circuitry, etc. Physical layer 306 also includes logical functions related to interface initialization and maintenance. Physical layer 306 is responsible for converting information received from data link layer 304 into an appropriate serialized format and transmitting the information across the PCI Express link at a frequency and width compatible with the components coupled to the other side of the link.

Figure 4:
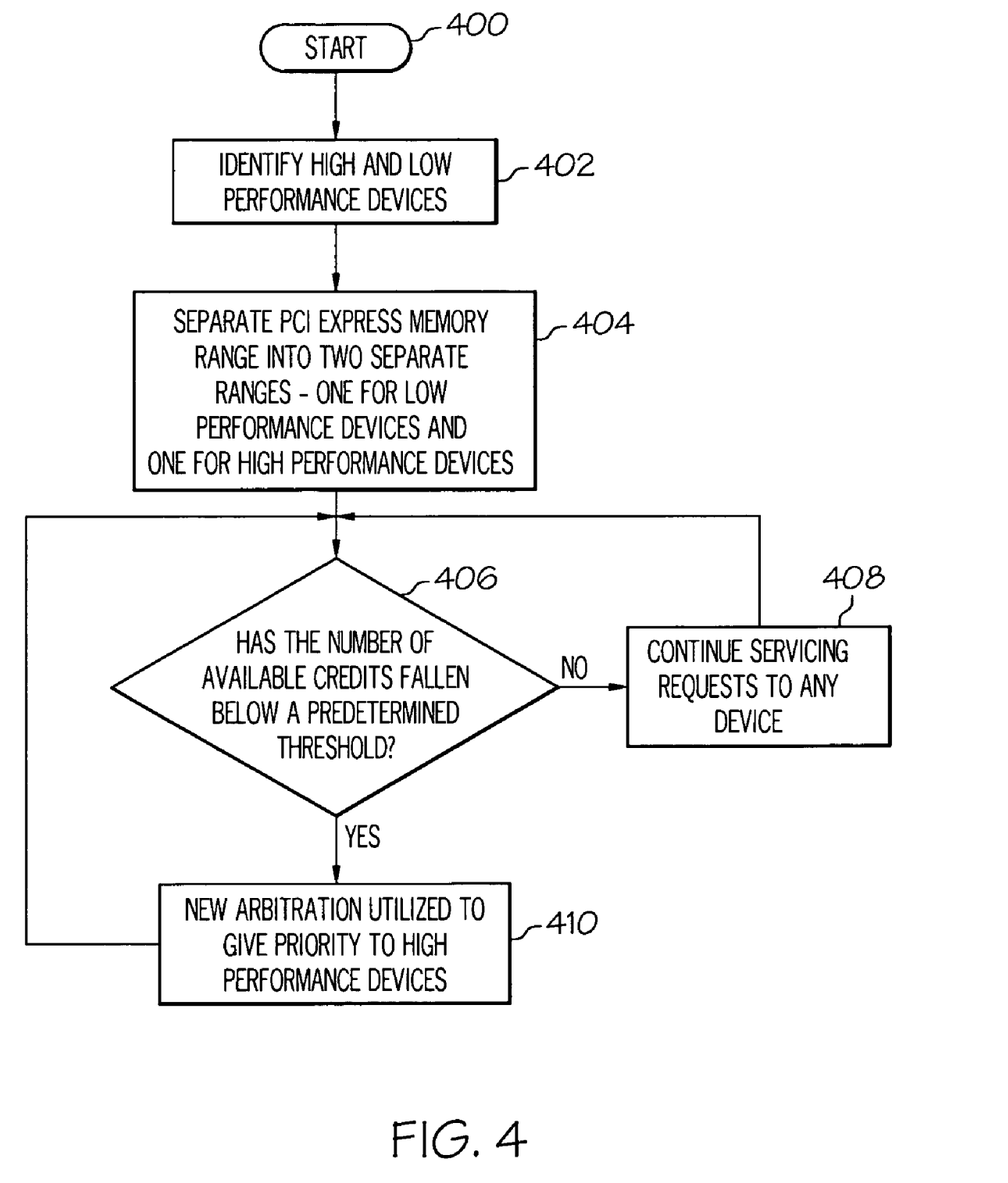
FIG. 4 is a high-level logical flowchart depicting an exemplary method of implementing multiple internal virtual channels based on a single external virtual channel according to a preferred embodiment of the present invention.

FIG. 4 illustrates a high-level logical flowchart diagram depicting an exemplary method of implementing multiple internal virtual channels based on a single external virtual channel. The process begins at step 400, and proceeds to step 402, which illustrates virtual channel manager 206 identifying high and low performance devices coupled to switch 112. In a preferred embodiment of the present invention, legacy endpoints 114-116 are implemented as low-performance devices while PCI Express endpoints 118-120 are implemented as high-performance devices.

The process continues to step 404, which illustrates virtual channel manager 206 separating a PCI Express memory range into two separate ranges: one range for low-performance devices and one range for high-performance devices. As previously discussed, during data processing system 100 initialization, several components are designated as physical virtual channel components (e.g., root complex 104 and switch 112) and traffic classes are assigned to the virtual channel serviced by the designated physical virtual channel components. Each component coupled to switch 112 is differentiated by its performance capacity and allocated to a specific memory range. This specific memory range represents one of multiple internal virtual channels within the single external virtual channel created by the physical virtual channel components.

The process continues to step 406, which illustrates flow control mechanism 308 determining whether the number of available transfer credits within the credit pool has fallen below a predetermined threshold number. If the number of available transfer credits has not fallen below a predetermined threshold, the process continues to step 408, which depicts switch 112 continuing processing requests to any attached device with no differentiation as to whether the requests are directed to high or low performance devices. The process returns to step 406 and proceeds in an iterative fashion.

If, however, flow control mechanism 308 determines that the number of available transfer credits within the credit pool has fallen below a predetermined threshold, the process continues to step 410, which illustrates virtual channel manager 206 utilizing a new command arbitration scheme that gives priority to high-performance devices. The new command arbitration scheme allows high-performance devices to have priority access to the PCI Express bus, and not be impeded by slower, low-performance devices taking up bandwidth on the bus. In a preferred embodiment of the present invention, virtual channel manager 206 may have a graded command arbitration scheme that is tailored to the number of available credits in the credit pool. For example, if there are three credits remaining in the credit pool, virtual channel manager 206 may allocate three credits to allow service of requests to high-performance devices and one credit may be allocated for requests to low-performance devices. As the number of available credits increases, more credits may be allotted for requests to low-performance devices. Those with skill in the art will appreciate that the present invention is not limited to the aforementioned command arbitration scheme, but any command arbitration scheme that gives priority to high-performance devices when the number of available credits in the credit pool has fallen below a predetermined number may be utilized. The process returns to step 406 and proceeds in an iterative fashion.

Figure 5:
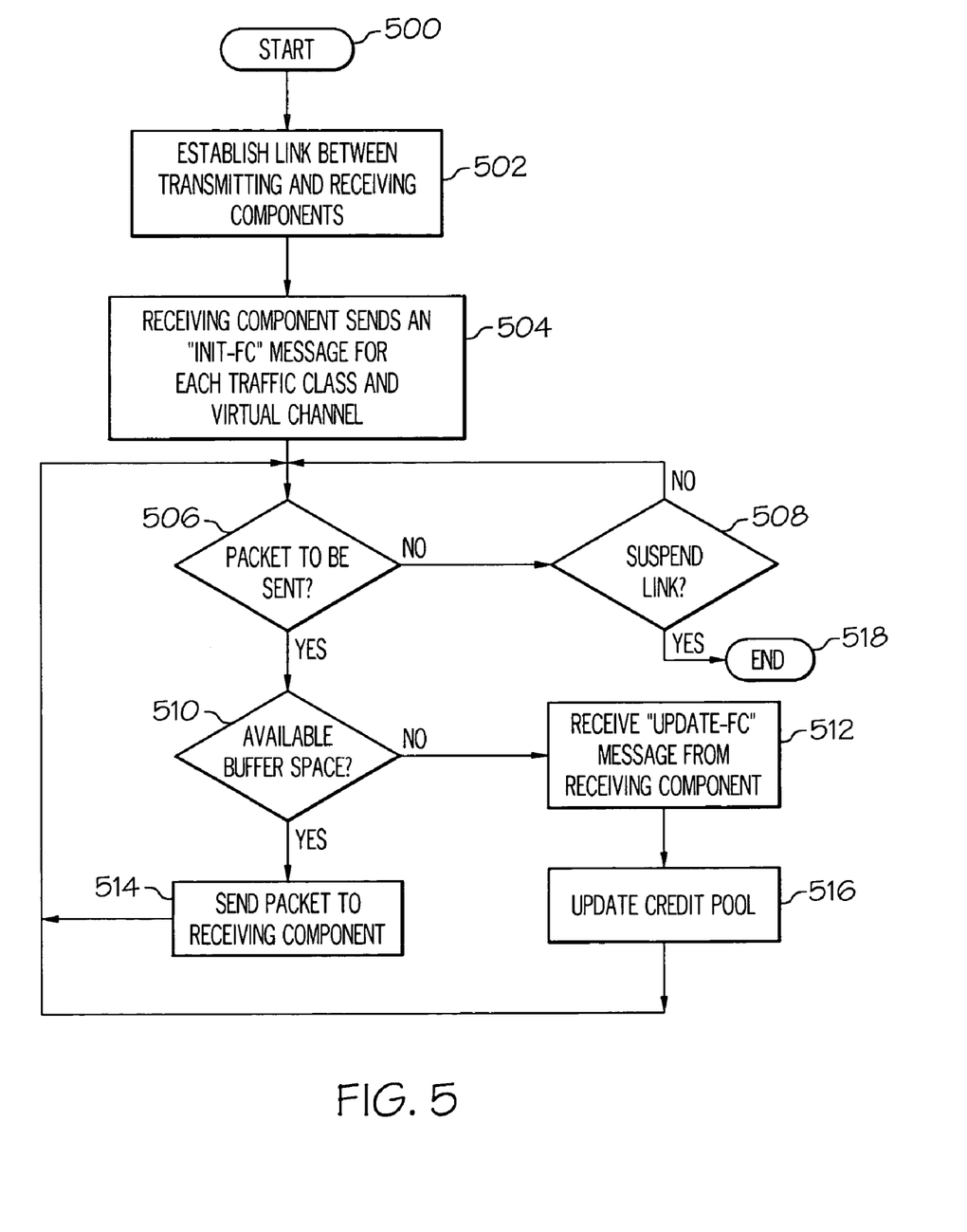
FIG. 5 is a high-level logical flowchart illustrating an exemplary method of implementing a credit-based flow control according to a preferred embodiment of the present invention.

Referring now to FIG. 5, there is illustrated a high-level logical flowchart diagram depicting an exemplary method of implementing a credit-based flow control according to a preferred embodiment of the present invention. As illustrated, the process begins at step 500 and proceeds to step 502, which illustrates a link established by transmitting and receiving components (e.g., processing unit 102 and PCI Express endpoint 118). The process continues to step 504, which depicts receiving component sending an "init-FC" message for each traffic class and virtual channel. Flow control mechanism 308 records the contents of the init-FC message. The init-FC message relays to the transmitting component the amount of buffer space is available at the receiving component to accept packets. The amount of buffer space available to process requests is measured by the number of transfer credits available in a credit pool maintained by flow control mechanism 308.

The process continues to step 506, which illustrates flow control mechanism 308 determining if the transmitting component has a packet to be sent to the receiving component. If there is no packet to be sent, the process proceeds to step 508, which illustrates virtual channel manager 206 determining whether the link between the transmitting component and receiving component is to be terminated. If the link is to be terminated, the process terminates, as illustrated in step 518. Returning to step 508, if the link is not to be terminated, the process returns to step 506 and continues in an iterative fashion.

Returning to step 506, if the transmitting component has a packet to be sent to the receiving component, the process proceeds to step 510, which illustrates flow control mechanism 308 determining if the receiving component has any available buffer space (i.e., if any transfer credits are available) to receive the packet. If there is available buffer space, the transmitting component will send the packet to the receiving component, as depicted in step 514. The process returns to step 506 and proceeds in an iterative fashion.

Returning to step 510, if flow control mechanism 308 determines that there is no available buffer space in the receiving component, the process proceeds to step 512, which depicts the receiving component sending an "update-FC" message to flow control mechanism 308 when more buffer space becomes available (due to the processing of buffered requests). Flow control mechanism 308 updates transfer credit pool with new information from the received update-FC message, as illustrated in step 516. The process returns to step 506 and proceeds in an iterative fashion.

As discussed, the present invention includes method, system, and computer-usable medium for coupling a collection of devices to a bridge, wherein the collection of devices includes high-performance devices and low-performance devices, coupling a data bus to the bridge, utilizing a collection of transfer credits to allow transfer of commands to the collection of devices, transferring commands to the collection of devices only when at least one transfer credit is available, and in response to determining a number of transfer credits falls below a predetermined threshold, utilizing a command arbitration scheme that gives priority to commands to the high-performance devices among the collection of devices.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD-ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A method comprising:
   coupling a plurality of devices to a bridge, wherein said plurality of devices includes high-performance devices and low-performance devices;

coupling a data bus to said bridge;
utilizing transfer credits to allow transfer of commands to said high-performance devices and said low-performance devices without priority while the transfer credits available remain above a predetermined threshold;
transferring commands to said plurality of devices only when at least one of the transfer credits is available; and
in response to determining that a number of the transfer credits available falls below the predetermined threshold, utilizing a command arbitration scheme that gives priority to commands to said high-performance devices.

2. The method according to claim 1, further comprising:
utilizing a virtual channel to transfer said commands to said plurality of devices.

3. The method according to claim 2, further comprising:
associating said commands to said virtual channel by information stored in a traffic class field.

4. The method according to claim 1, further comprising:
maintaining a credit pool including said plurality of transfer credits.

5. The method according to claim 1, wherein said data bus is a PCI Express bus.

6. A system comprising:
a processor;
a data bus coupled to said processor;
a bridge, coupled to said data bus;
a plurality of devices, including high-performance and low-performance devices, wherein said plurality of devices are coupled to said bridge;
a computer-usable medium embodying computer program code, said computer program code comprising instructions executable by said processor and configured for:
utilizing transfer credits to allow transfer of commands to said high-performance devices and said low-performance devices without priority while the transfer credits available remain above a predetermined threshold;
transferring commands to said plurality of devices only when at least one of the transfer credits is available; and
in response to determining that a number of the transfer credits available fails below the predetermined threshold, utilizing a command arbitration scheme that gives priority to commands to said high-performance devices.

7. The system according to claim 6, wherein said instructions are further configured for:
utilizing a virtual channel to transfer said commands to said plurality of devices.

8. The system according to claim 7, wherein said instructions are further configured for:
associating said commands to said virtual channel by information stored in a traffic class field.

9. The system according to claim 6, wherein said instructions are further configured for:
maintaining a credit pool including said plurality of transfer credits.

10. The system according to claim 6, wherein said data bus is a PCI Express bus.

11. A computer-usable medium embodying computer program code, said computer program code comprising computer executable instructions configured for:
utilizing transfer credits to allow transfer of commands to high-performance devices and low-performance devices, included within a plurality of devices, without priority while the transfer credits available remain above a predetermined threshold;
transferring commands to said plurality of devices only when at least one of the transfer credits is available; and
in response to determining a number of the transfer credits available falls below the predetermined threshold, utilizing a command arbitration scheme that gives priority to commands to said high-performance devices among said plurality of devices, wherein the computer-usable medium is a computer-usable storage medium.

12. The computer-usable medium according to claim 11, wherein said embodied computer program code further comprises computer executable instructions configured for:
utilizing a virtual channel to transfer said commands to said plurality of devices.

13. The computer-usable medium according to claim 12, wherein said embodied computer program code further comprises computer executable instructions configured for:
associating said commands to said virtual channel by information stored in a traffic class field.

14. The computer-usable medium according to claim 11, wherein said embodied computer program code further comprises computer executable instructions configured for:
maintaining a credit pool including said plurality of transfer credits.

* * * * *

UNITED STATES PATENT AND TRADEMARK OFFICE
CERTIFICATE OF CORRECTION

PATENT NO. : 7,660,917 B2
APPLICATION NO. : 11/366883
DATED : February 9, 2010
INVENTOR(S) : Freking et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Thirtieth Day of November, 2010

David J. Kappos
*Director of the United States Patent and Trademark Office*